United States Patent [19]

Bajohr et al.

[11] Patent Number: 4,718,319

[45] Date of Patent: Jan. 12, 1988

[54] ARRANGEMENT FOR THE ORIENTING OF THE OPEN ENDS OF HOLLOW BODIES

[75] Inventors: Walter Bajohr, Troisdorf; Willi Bornheim, Troisdorf-Oberlar; Hartmut Gruber, St. Augustin; Heinz-Ernst Wagner, Troisdorf-Spich, all of Fed. Rep. of Germany

[73] Assignee: Dynamit Nobel AG, Troisdorf, Fed. Rep. of Germany

[21] Appl. No.: 882,721

[22] Filed: Jul. 7, 1986

[30] Foreign Application Priority Data

Jul. 5, 1985 [DE] Fed. Rep. of Germany ....... 3524079

[51] Int. Cl.[4] ........................ F42B 33/00; B21G 3/32; B21K 27/00; B23Q 7/12

[52] U.S. Cl. .................................... 86/46; 10/162 A; 86/44; 86/45; 221/156; 221/167; 221/169; 221/172

[58] Field of Search .................... 86/23, 24, 44, 45, 46; 10/162 A, DIG. 6; 221/156, 167, 169, 172, 173; 193/44

[56] References Cited

U.S. PATENT DOCUMENTS

| | | | |
|---|---|---|---|
| 1,242,086 | 10/1917 | von Henriquez | 86/46 |
| 1,408,497 | 3/1922 | Bragdon | 86/46 |
| 2,364,243 | 12/1944 | Riddle | 209/72 |
| 2,366,256 | 1/1945 | Harris et al. | 86/45 |
| 2,394,200 | 2/1946 | Nelson | 209/72 |
| 2,406,176 | 8/1946 | Vergobbi | 86/45 |
| 2,433,561 | 12/1947 | Angell | 86/46 |
| 2,453,736 | 11/1948 | Woodberry et al. | 86/45 |
| 2,635,261 | 4/1953 | Stewart et al. | 86/45 |
| 3,572,494 | 3/1971 | Aidlin et al. | 221/156 |
| 3,791,553 | 2/1974 | Aidlin et al. | 221/156 |
| 3,893,557 | 7/1975 | Frenk | 86/45 |
| 4,455,915 | 6/1984 | Ransom | 86/45 |

FOREIGN PATENT DOCUMENTS 668010 12/1936 Fed. Rep. of Germany .

*Primary Examiner*—Stephen J. Lechert, Jr.
*Assistant Examiner*—Howard T. Locker
*Attorney, Agent, or Firm*—Antonelli, Terry & Wands

[57] ABSTRACT

The casings are guided through a supply duct to a sorting roller which possesses an arresting duct with a pin extending axially and, in the same cross-sectional plane, a transit duct. Those casings which arrive with the casing base directed upwardly penetrate into the arresting duct, with the case base resting on the free end of the pin. On subsequent rotation of the sorting roller through 180°, the casing falls into the outlet duct with base directed downwardly. Casings, which arrive with base pointing downwardly, run up against the pin and rest on the periphery of the roller until, after 180° rotation of the transit duct, they align with the supply duct and can fall unhindered into the outlet duct. All casings fall into the outlet duct with their base directed downwardly.

12 Claims, 6 Drawing Figures

ARRANGEMENT FOR THE ORIENTING OF THE OPEN ENDS OF HOLLOW BODIES

Figure 1:
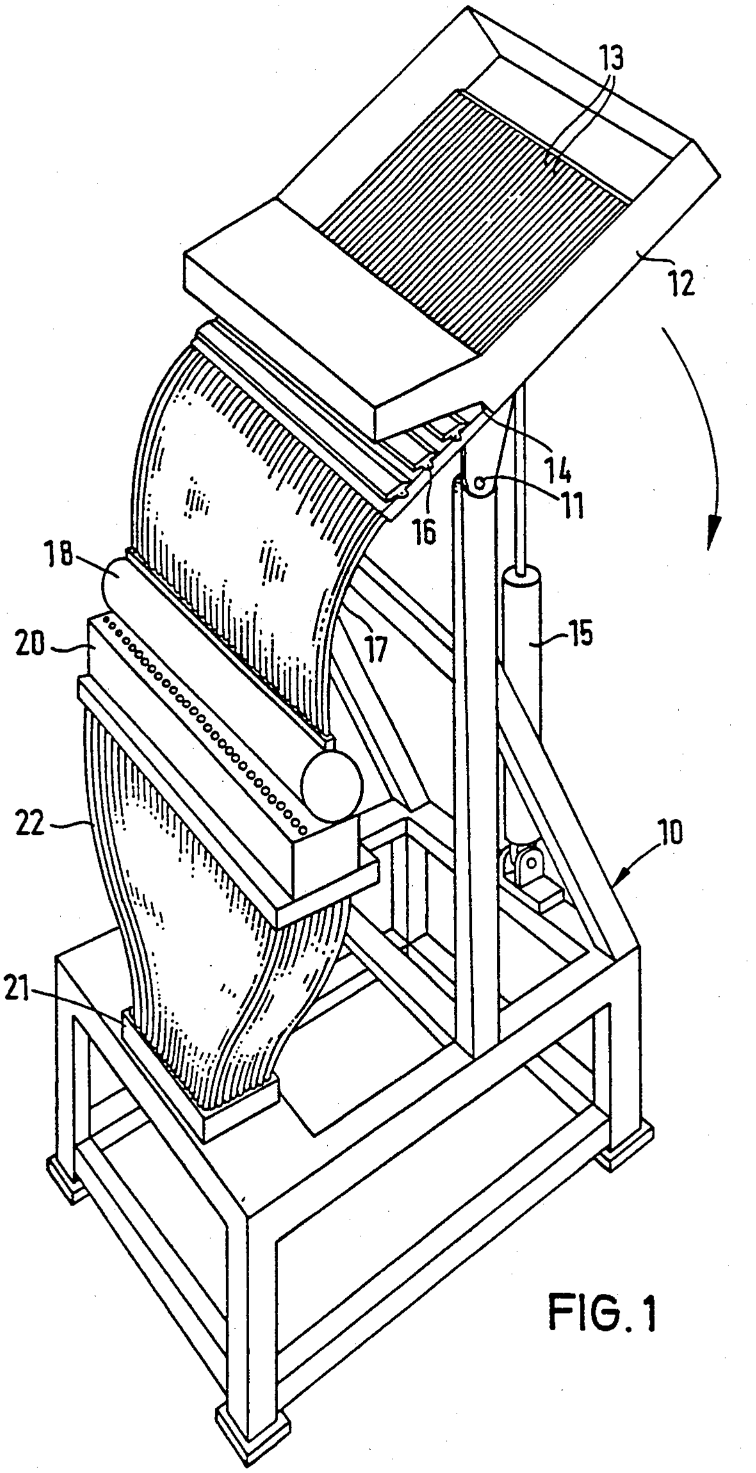

The invention relates to an arrangement for the orienting of the open ends of hollow bodies made of metal, plastic or the like and having approximately cylindrical shapes; which bodies have on one end a closure in the form of a completely or partially closed base, and each of which exhibit a maximum cross-sectional diameter essentially less than its lengthwise dimension.

Casings for explosive shells, munitions and the like are produced separately from the contents of the casing and the contents of the casing are only subsequently introduced into the finished casings. The casings are arranged haphazardly after their production and they must not only be oriented axially, but the bodies of the casing must also be brought into a specific position before any further treatment can take place.

It is known to transport casings for the purpose of the orientation of each casing body on a type of beam balance so that the half of the balance on which the casing body is located drops on account of its greater weight. Furthermore, it is known to orient casings on a slanting plane in which parallel grooves are arranged, by shaking axially. The casings arriving at the lower end of the plane are, insofar as the casings arrive with the open end first, placed in an inverted condition on grooves, in order to fall down, as a result of their weight, base down. The casings which arrive with the base end first, hit against the grooves and immediately fall into a collection funnel.

With the known processes for the orienting of the casing bases, the position of the center of gravity of the casing is utilized for turning the casing. These processes are not sufficiently reliable so that both orientation errors and jamming can occur.

The invention is based on the object of producing an arrangement of the initially indicated type in which sensing of the base or closed end of the casing takes place and, depending on the result of the sensing, a coerced turning of the casing takes place without relying on the position of the center of gravity of the casing.

This object is obtained in accordance with the invention by an apparatus or arrangement wherein a rotating sorting roller is provided, the at least one supply duct is arranged to guide hollow bodies to a peripheral surface of the roller; the sorting roller, in a transverse plane of a supply duct, having a transit duct and an associated arresting duct containing a longitudinally extending pin; and at least on outlet duct leading away from the surface of the sorting roller turned away from the supply duct for directing away the hollow bodies each orientated in the same manner.

With the arrangement according to the invention, an arresting duct is oriented or aligned with each supply duct in a receiving position of the sorting roller. Those hollow bodies which arrive with the open end facing downwardly first penetrate into the arresting duct, but the body is impeded against further movement on hitting of the base against the end of the pin.

In the subsequent rotation of the sorting roller around its longitudinal axis, those hollow bodies within the roller are turned so that they fall out from the sorting roller with the base first; i.e., facing downwardly. Those hollow bodies which arrive with the base first; i.e., with the base at the lower and front end, hit the base against the end of the pin so that, in general, the bodies cannot penetrate into the arresting ducts in the sorting roller. On rotation of the sorting roller, the transit ducts proceed into orientation with the associated supply ducts so that the hollow bodies are transported through the transit duct into an outlet duct. Therefore, all the hollow bodies, independently of whether they arrive at the sorting roller with the base end or the open end facing toward the roller, are transported with the base forward; e.g., facing downward, into an outlet duct.

A special advantage of the arrangement according to the invention consists in that it can treat different hollow body lengths without the need to be occupied with variations or adjustments in the arrangement. Also hollow bodies with different diameters can be treated in a like manner. It will be understood that the dimensions of the supply duct and associated transit duct and arresting duct will need to be of appropriate cross-section to accommodate the hollow bodies of different sizes.

The loading of the hollow bodies into the sorting roller and the guiding out from the sorting roller takes place preferably by force of gravity, with the sorting roller being arranged with its axis horizontal and the supply duct and the outlet duct extending essentially vertically.

It is, however, also possible for the supply and removal of the bodies to be undertaken independently of the force of gravity, for example, with the assistance of pressurized air.

Preferably, the transit duct and the arresting duct are equi-distant from the axis of rotation of the sorting roller and are essentially parallel to one another.

Preferably, a single outlet duct is shaped like a funnel and faces the sorting roller with its larger end and the larger end embraces both the transit duct and also the arresting duct if the transit duct is aligned with the supply duct. In this way, only a single outlet duct is necessary for the transit duct and for the associated arresting duct associated with each supply duct. Alternatively, there also exists the possibility of providing two separate outlet ducts which later combine again.

In the following detailed description, an embodiment of the invention is further described with reference to the accompanying drawings wherein:

FIG. 1 is a schematic perspective representation of the arrangement or apparatus for the orientation of hollow bodies; namely, ammunition casings; and FIGS. 2 through 6 is a cross-section through a sorting roller in different operating states.

The apparatus for the orientation of open ended casings comprises a frame 10 at an upper end of which is arranged a supply container 12 pivotable about a horizontal axis 11. The supply container 12 is open at its upper surface and its base is provided with numerous parallel grooves 13 which run transversely to the pivoting axis 11 and open to the outlet 14. A drive arrangement 15 engages the underside of the supply container 12 about the axis 11 in order to orientate the casings lying in the supply container 12 axially in the grooves 13.

Behind the outlet 14 of the container 12 is arranged a separating means 16 comprises of several strips which can be individually pivoted; i.e., moved to an inclined position, in order to advance a row of casings to the next strip. Afterwards the strips are swung up again in order to receive the next following row of casings.

The separating means 16 comprise at least two swivel-mounted strips which are operated, for example, electrically or pneumatically.

The function of the separating means may be as follows:

At the beginning when the supply container 12 is stopped in its inclined position, the two strips (or the three shown in FIG. 1) are so inclined against the grooves 13 (not shown in the drawings) that the upper one blocks the casings from moving into the conduits 17. Then the upper strip is pivoted so that the casings can proceed to the next strip.

If, in contrast to FIG. 1 no further strip is present, the upper strip is pivoted back into its first position to prevent further movement of the casings in the grooves 13 and the other strip is pivoted so that the row of casings in front of this strip may glide underneath it and enter into the conduits 17. After that, this strip is pivoted again in its blocking position. This separating procedure will start again when the casings have been led through the roller 19 into the ducts 22.

The outlet end of the separating means 16 is connected with numerous parallel supply ducts 17 for the supply of the casings to the roller housing 18. The supply ducts 17 are pipes or tubes each of which is allocated for the through admission of a casing which has been released by the separating arrangement. The supply ducts 17 lead through the upper region of the peripheral wall of the roller housing 18 arranged with its axis in a horizontal position. Below the roller housing 18 is arranged a distributor 20 out of which numerous outlet ducts 22 emerge. These outlet ducts lead to a transporting pallet 21 having holes into which are introduced the casings with the base or closed ends directed downwardly. The distributor 20 has drive means (not shown) to move the distributor transversely to the roller 19 in order to supply the plurality of outlet ducts 22.

FIGS. 2 to 6 show a cross-section through a sorting roller 19 which is arranged in the interior of the roller housing 18 and which is rotatable around its horizontal axis. The sorting roller 19 has, in a transverse plane passing through each supply duct 17, an arresting duct 23 and a transit duct 24. Both ducts 23 and 24 extend parallel to one another and having equal spacing from the rotational axis of the sorting roller 19. The arresting duct 23 is formed as a blind bore or passage which leads from one open end at the periphery of the roller to an oppositely position closed end located in the interior of the sorting roller. A pin 26 projects from the closed end coaxially through the arresting duct 23 up to the peripheral surface of the roller. The transit duct or passage 24 extends through the roller 19 and has openings at each end at a peripheral surface of the roller. These ducts each have a transverse cross-section, which is large enough to allow entry and passage of the casing. In the embodiment shown in FIGS. 2 to 6, the distributor 20 is omitted for sake of simplification, and the discharge end of duct 17, the housing 18 and the duct 22 are shown as being in a single unit to illustrate the principles of the invention.

Figure 2:
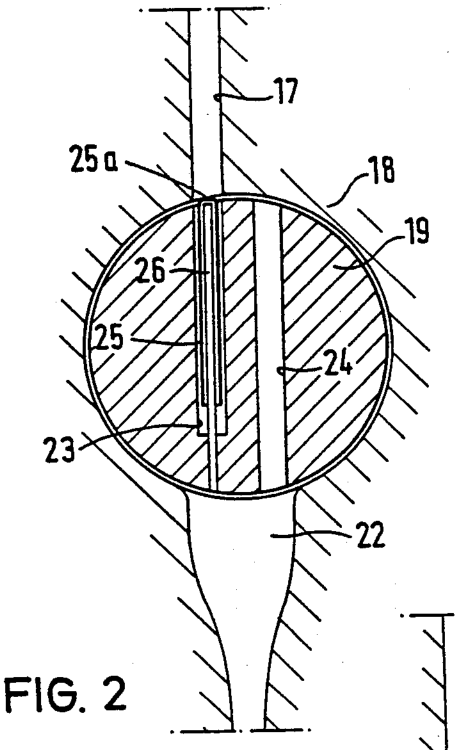

In FIG. 2 is shown the situation when a casing 25 arrives from the supply duct 17 with the casing base **25*a* directed rearward or upwardly, while the sorting roller 19 is in the waiting position in which the arresting duct 23 is oriented with (i.e., in alignment with) the supply duct 17. The casing 25 passes; i.e., falls, into the arresting duct 23 until the casing base 25*a* hits against the free end of the pin 26. The casing 25 is then located almost completely in the interior of the sorting roller 19, sitting on the pin 26. Only the casing base 25*a* extends slightly over the contour of the peripheral surface of the sorting roller 19. In order that the sorting roller 19 can be turned in this condition, the internal diameter of the roller housing 18 is slightly larger than the external periphery of the sorting roller 19**.

Figure 3:
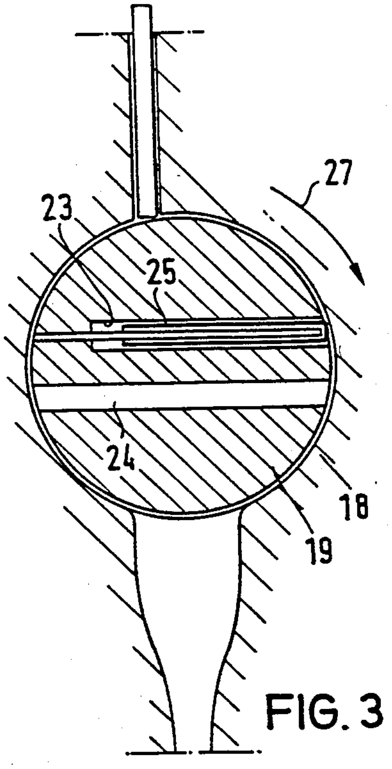

After the casing 25 has been received by the arresting duct 23 the sorting roller 19 is turned in the direction of the arrow 27 according to FIG. 3. After a rotation of about 180°, the opening; i.e., the open end, of the arresting duct 23 is located above and in the region of the funnel shaped outlet duct 22 which lies opposite the supply duct 17. The casing 25 now falls out of the arresting duct 23, on account of gravity, with the casing base 25 being directed downwardly. Subsequently, the sorting roller 19 is turned back again until it assumes again the reception position shown in FIGS. 2 and 5.

Figure 4:
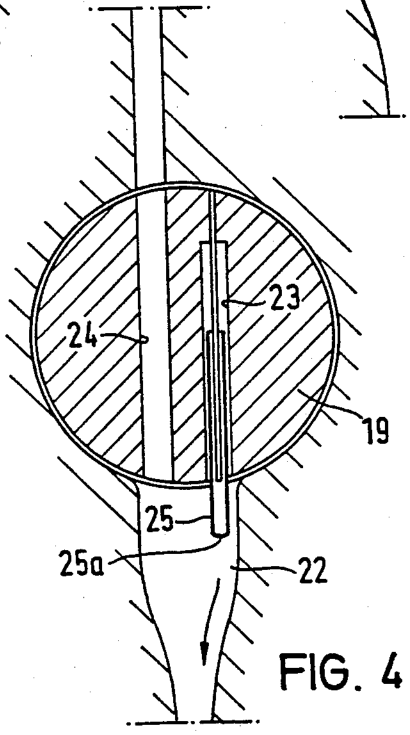
Figure 5:
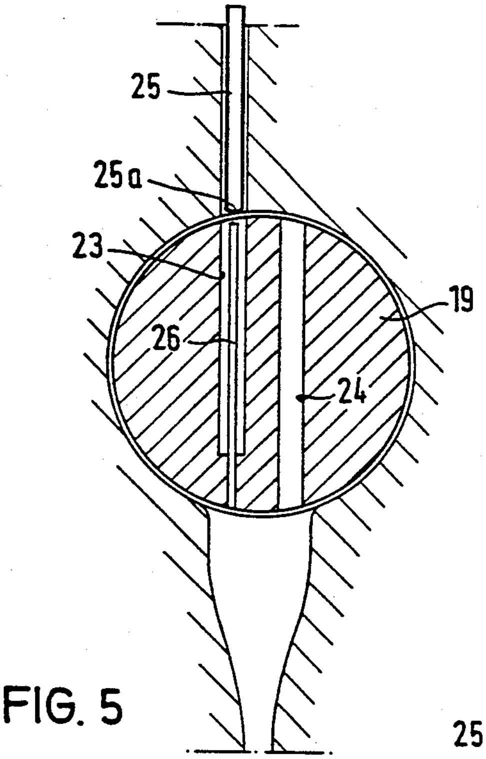
Figure 6:
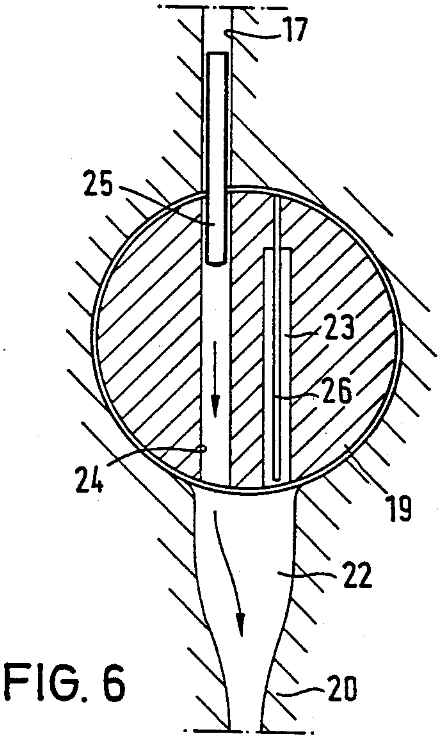

In FIG. 5 is shown the situation when a casing 25 meets the sorting roller 19 with casing base **25*a* directed to the front or downwardly. Casing base 25*a* hits against the end of the pin 26 so that the casing 25 cannot penetrate or enter into the sorting roller. Should the sorting roller 19 subsequently be turned about 180°, then the transit duct 24 proceeds into orientation or alignment with the supply duct 17. The casing 25 which had previously supported itself with the base 25*a* on the periphery of the roller, now falls in free fall through the transit duct 24 which is open at both ends, into the outlet duct 22. In the outlet position, which is shown in FIGS. 4 and 6, the funnel shaped outlet duct 22 embraces the openings of the arresting duct 23 and the transit duct 24. In the outlet position, the casing 25 leaves the sorting roller 19 with casing base 25*a* pointing forwardly; independently of whether it has arrived according to FIG. 2 with rearwardly pointing base or according to FIG. 5 with forwardly pointing base. Subsequently, the sorting roller 19** is rotated back again.

The casings are introduced haphazardly into the supply container 12. Subsequently, the drive arrangement 15 is operated several times in order to shake the casings and orientate them in the grooves. With the container base arranged in an inclined position, the drive arrangement 15 is then stopped and a row of casings is supplied by means of the separating means 16 to the supply ducts 17. The sorting roller 19 is provided with an arresting duct 23 and associated transit duct 24 for each supply duct 17. The casings 25 which leave the sorting roller with bases directed downwardly are conducted by means of the outlet ducts 22 to the retaining holes or cavities of the transport pallet 21.

In the embodiment of the invention heretofore described, the hollow bodies consist of casings, which are used for the production of explosive shells, munitions, etc. The arrangement, according to the invention, is, however, also usable for the orientation of other hollow bodies of longitudinal basic form, for example, for tablet tubes, test tubes, writing products (ballpoint pen casings), cosmetic articles, lipstick and eyebrow pencil cases, as well as for spray containers, in particular for cosmetic or pharmaceutical products. This enumeration only provides some examples and is not complete.

What is claimed is:

1. An arrangement for the orientation of the open ends of hollow bodies with approximately cylindrical shapes, each of said bodies having at one end a closure providing an at least partially closed base and a maximum cross-section that is less than its length, characterized in that at least one supply duct for transporting a hollow body with an open end is provided; a rotating sorting roller for orienting the open end of said hollow body is arranged so that the at least one supply duct is directed onto a peripheral surface of said roller; the sorting roller having in a plane transverse to said at least one supply duct a transit duct and an associated arresting duct; said arresting duct containing a longitudinally extending projection and at least one outlet duct that is arranged to receive a hollow body from a peripheral surface of the sorting roller opposite to the supply duct for guiding away hollow bodies sorted by said roller.

2. An arrangement according to claim 1, characterized in that the transit duct and the arresting duct are equi-distant from the rotational axis of the sorting roller and extend essentially parallel to one another.

3. An arrangement according to claim 1, characterized in that the at least one outlet duct is formed in the shape of a funnel and has a larger end facing the sorting roller; the larger end embracing both the transit duct and also the arresting duct when the transit duct is aligned with the supply duct.

4. An arrangement according to claim 2, characterized in that the at least one outlet duct is formed in the shape of a funnel and has a larger end facing the sorting roller; the larger end embracing both the transit duct and also the arresting duct when the transit duct is aligned with the supply duct.

5. An arrangement according to claim 1, characterized in that a displaceable supply container for receiving a plurality of hollow bodies is arranged in a path for the hollow bodies before the at least one supply duct, said container having an outlet for discharging the hollow bodies, and a bottom portion that is inclined towards the outlet; said bottom portion having at least one groove for guiding a plurality of the hollow bodies sequentially in a row leading to the outlet.

6. An arrangement according to claim 1, characterized in that the outlet of the supply container is connected with a separating means for separating the bodies and introducing individual bodies into the supply duct leading to the sorting roller.

7. An arrangement for the orientation of the open ends of hollow bodies with approximately cylindrical shapes, each of said bodies having at one end a closure providing an at least partially closed base and a maximum cross-section that is less than its length, which comprises at least one supply duct for transporting a hollow body with an open end; a rotating sorting roller for orienting the open end of said hollow body, said sorting roller being arranged below the supply duct so that the at least one supply duct is directed onto a peripheral surface of said roller; the sorting roller having, in a plane transverse to said at least one supply duct, a transit duct and an associated arresting duct; a longitudinally extending projection axially positioned within said arresting duct; and at least one outlet duct for guiding away hollow bodies sorted by said roller; said outlet duct being arranged to receive a hollow body from either the transit duct or the associated arresting duct along a peripheral surface of the sorting roller and being positioned opposite to the supply duct; said sorting roller being rotatable from a waiting position wherein the arresting duct is aligned with the supply duct to a discharge position where the aressting duct is aligned with the outlet duct, the arresting duct receiving a hollow body having its partially closed base directed upwardly and rejecting a hollow body with its partially closed base directed downwardly; the rejected hollow body being discharged through said transit duct upon further rotation of said sorting roller.

8. An arrangement according to claim 7, wherein the transit duct and the arresting duct are equi-distant from the rotational axis of the sorting roller and extend essentially parallel to one another.

9. An arrangement according to claim 7, wherein the at least one outlet duct is formed in the shape of a funnel and has a larger end facing the sorting roller; the larger end embracing both the transit duct and also the arresting duct when the transit duct is aligned with the supply duct.

10. An arrangement according to claim 8, wherein the at least one outlet duct is formed in the shape of a funnel and has a larger end facing the sorting roller; the larger end embracing both the transit duct and also the arresting duct when the transit duct is aligned with the supply duct.

11. An arrangement according to claim 7, wherein a displaceable supply container for receiving a plurality of hollow bodies is arranged in a path for the hollow bodies before the at least one supply duct, said container having an outlet for discharging the hollow bodies, and a bottom portion that is inclined towards the outlet; said bottom portion having a groove for guiding a plurality of the hollow bodies sequentially in a row leading to the outlet.

12. An arrangement according to claim 7, wherein the outlet of the supply container is connected with a separating means for separating the bodies and introducing individual bodies into the supply duct leading to the sorting roller.

* * * * *